US009346487B2

(12) United States Patent
Kimpara et al.

(10) Patent No.: US 9,346,487 B2
(45) Date of Patent: May 24, 2016

(54) ELECTRIC POWER STEERING APPARATUS

(75) Inventors: Yoshihiko Kimpara, Chiyoda-ku (JP); Akihiko Mori, Chiyoga-ku (JP); Masaki Matsushita, Chiyoda-ku (JP); Jiro Okada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 14/353,542

(22) PCT Filed: Jan. 11, 2012

(86) PCT No.: PCT/JP2012/050347
§ 371 (c)(1),
(2), (4) Date: Apr. 23, 2014

(87) PCT Pub. No.: WO2013/105225
PCT Pub. Date: Jul. 18, 2013

(65) Prior Publication Data
US 2015/0298727 A1    Oct. 22, 2015

(51) Int. Cl.
*B62D 5/04* (2006.01)
*G08B 3/10* (2006.01)
(52) U.S. Cl.
CPC ............ *B62D 5/0484* (2013.01); *B62D 5/0463* (2013.01); *B62D 5/0487* (2013.01); *G08B 3/10* (2013.01)
(58) Field of Classification Search
CPC .............. B62D 6/00; B62D 6/02; B62D 6/04; B62D 5/04; B62D 5/0487; B62D 5/0484
USPC ............... 701/42, 43; 180/446, 443; 318/432, 318/376, 453, 490
See application file for complete search history.

(56) References Cited

U.S. PATENT DOCUMENTS

| | | |
|---|---|---|
| 2004/0007416 A1 | 1/2004 | Furumi et al. |
| 2005/0087390 A1 | 4/2005 | Furumi et al. |
| 2005/0093489 A1 | 5/2005 | Furumi et al. |
| 2009/0153090 A1* | 6/2009 | Ishihara ................. H02P 7/285 318/503 |

(Continued)

FOREIGN PATENT DOCUMENTS

| | | |
|---|---|---|
| JP | 61-10818 A | 1/1986 |
| JP | 61 10818 A | 1/1986 |
| JP | 2004-129402 A | 4/2004 |

(Continued)

OTHER PUBLICATIONS

Communication dated Oct. 28, 2014, issued by the Japanese Patent Office in counterpart Application No. 2013553131.

(Continued)

*Primary Examiner* — Marthe Marc-Coleman
(74) *Attorney, Agent, or Firm* — Sughrue Mion, PLLC

(57) ABSTRACT

The apparatus herein provided includes a plurality of systems including driving circuits (20a, 20b) for driving motor coils (3a, 3b) corresponding thereto, and a control unit (10) for controlling control values of the driving circuits (20a, 20b), wherein, when a fault occurs in at least one of the plurality of systems including the motor coils (3a, 3b), the control unit (10) decreases a control value of a system(s) in which the fault occurs from an ordinary time control value or stops the drive by the system(s) in which the fault occurs, and also increases a control value of another system(s) in which the fault does not occur to more than an ordinary time control value.

9 Claims, 5 Drawing Sheets

(56) References Cited

U.S. PATENT DOCUMENTS

| 2011/0074323 A1 | 3/2011 | Mukai |
| 2011/0156629 A1 | 6/2011 | Satou et al. |

FOREIGN PATENT DOCUMENTS

| JP | 2004129402 | * | 4/2004 |
| JP | 2004129402 | A | 4/2004 |
| JP | 2008-132919 | A | 6/2008 |
| JP | 2008132919 | A | 6/2008 |
| JP | 201178221 | A | 4/2011 |
| JP | 2011-131860 | A | 7/2011 |
| JP | 2011-176908 | A | 9/2011 |

OTHER PUBLICATIONS

International Search Report of PCT/JP2012/050347 dated Apr. 24, 2012.

Communication dated Jun. 2, 2015, issued by the Japan Patent Office in corresponding Japanese Application No. 2013-553131.

Communication dated Dec. 28, 2015, issued by the Japan Patent Office in corresponding Japanese Application No. 2013-553131, pp. 1-4.

* cited by examiner

ELECTRIC POWER STEERING APPARATUS

CROSS REFERENCE TO RELATED APPLICATIONS

This is a National Stage of International Application No. PCT/JP2012/050347 filed Jan. 11, 2012, the contents of which are incorporated herein by reference in its entirety.

TECHNICAL FIELD

The present invention relates to an electric power steering apparatus, and more particularly to an electric power steering apparatus configured to produce assist torque by controlling a plurality of systems corresponding to a plurality of motor coils provided in a motor.

BACKGROUND ART

An electric power steering apparatus is, as is well known, an apparatus which is configured to assist in driver's steering force using driving force of a motor; nevertheless, a conventional electric power steering apparatus is configured in most cases to include one driving circuit for one motor. However, in recent years, it can be known that an electric power steering apparatus is mounted on a whole category of wheeled vehicles, thereby revealing that, if assist functions stop due to a failure or fault of the electric power steering apparatus, it is close to impossible for the driver to operate the steering wheel, causing difficulties in running the wheeled vehicle itself. For this reason, the need is intensified to continue the assist, depending on content of the fault, as much as possible even when the electric power steering apparatus becomes faulty.

For dealing therewith, conventionally, an electric power steering apparatus is proposed in which two sets of three-phase motor coils are provided for one motor, and two sets of driving circuits are included to separately control each of those three-phase motor coils (for example, refer to Patent Document 1). The conventional electric power steering apparatus disclosed in Patent Document 1 is so arranged that, when a fault is detected in one system constituted of a set of three-phase motor coils by a fault detection means, the control is continued by decreasing a motor instruction value using a remaining normal system. At this time, because the motor instruction value is decreased, assist force by the motor becomes smaller, so that a driver can recognize that the fault occurs in the electric power steering apparatus.

RELATED ART DOCUMENT

Patent Document

[Patent Document 1] Japanese Laid-Open Patent Publication No. 2011-131860

DISCLOSURE OF THE INVENTION

Problems to be Solved by the Invention

Because the conventional apparatus disclosed in Patent Document 1 is so arranged as described above that, when one system becomes faulty, a motor instruction value of the other normal system is decreased, in order to notify the fault to the driver, so that a motor current value is lowered than that of ordinary times, there arises a problem in that, though the driver can recognize the fault, a steering wheel cannot be operated without applying thereto larger steering force than that of ordinary times, resulting in an increased workload to the driver.

The present invention has been directed at solving these problems in a conventional electric power steering apparatus described above, and an object of the invention is to provide an electric power steering apparatus that can mitigate a driver's workload in response to steering-wheel operations, even when a failure or fault occurs.

Means for Solving the Problems

An electric power steering apparatus according to the present invention is configured to assist in steering force of a driver by driving force of a motor having a plurality of independent motor coils, and the electric power steering apparatus comprises:

a plurality of systems including driving circuits provided for every one of the plurality of motor coils, for driving the motor coils corresponding to the driving circuits; and a control unit for controlling control values of the driving circuits, wherein, when a fault occurs in at least one of the plurality of systems including the motor coils, the control unit decreases a control value of a system in which the fault occurs from an ordinary time control value thereof or stops the drive by a system in which the fault occurs, and also increases a control value of a system in which the fault does not occur to more than an ordinary time control value thereof.

Effects of the Invention

According to the electric power steering apparatus of the present invention, even when at least one of systems becomes faulty, a driver's workload in response to steering-wheel operations is mitigated, and also steering assist can be secured and the secured one is continued.

EMBODIMENTS FOR CARRYING OUT THE INVENTION

Embodiment 1

Figure 1:
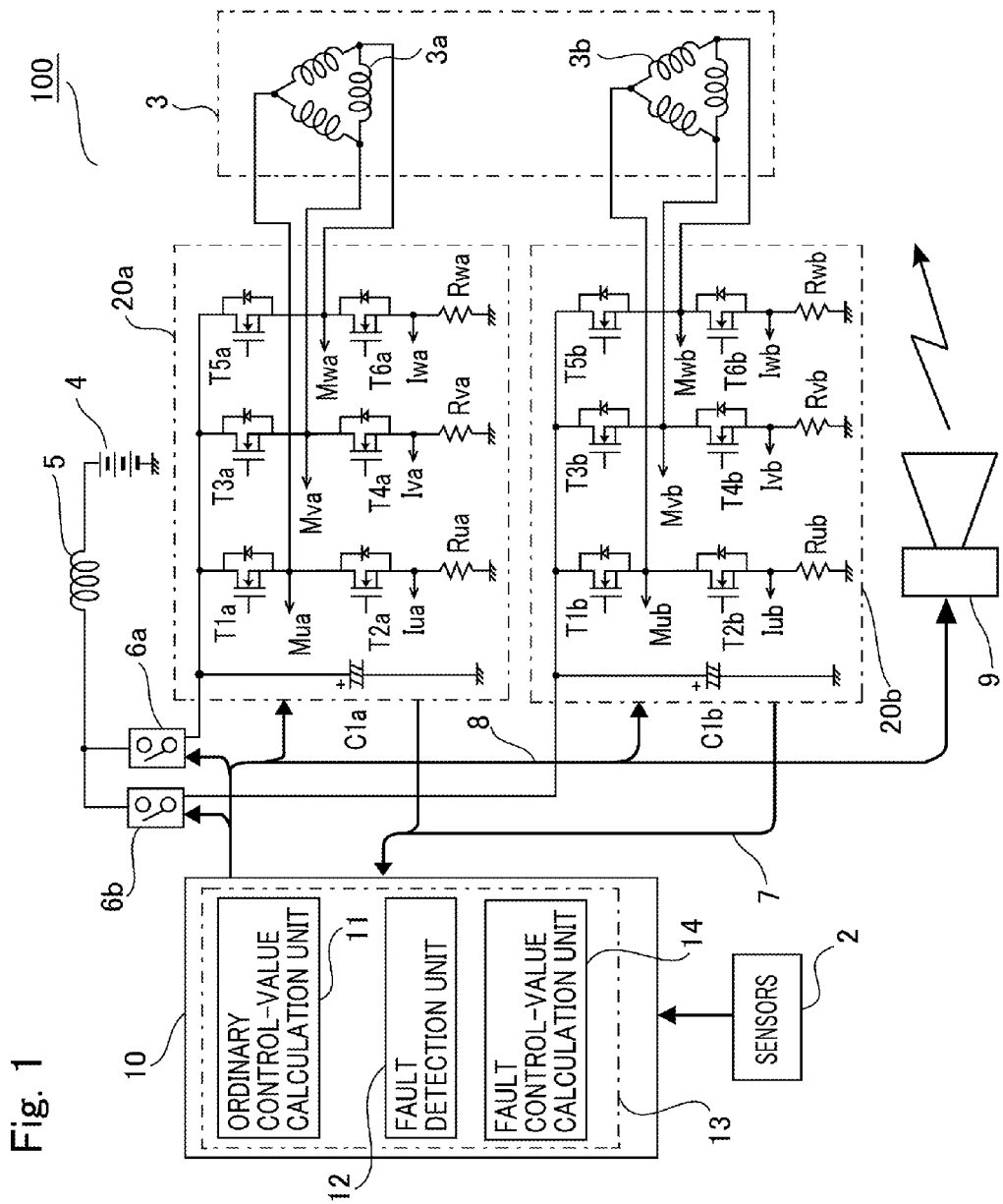
FIG. 1 is a diagram illustrating a circuit configuration of an electric power steering apparatus according to Embodiment 1 of the present invention.

Hereinafter, the explanation will be made referring to the drawings for an electric power steering apparatus according to Embodiment 1 of the present invention. FIG. 1 is a diagram illustrating a circuit configuration of the electric power steering apparatus according to Embodiment 1 of the present invention, showing a case in which two sets of motor coils, a first motor coil and a second motor coil are included in a motor, as this will be described later.

In the following explanation, a system including the first motor coil, a first inverter as a first driving circuit that supplies electric power to the first motor coil, and a first relay connected between the first inverter and a battery is collectively referred to as a first system, and will be explained by designating "a" at the end of each of constituent element's symbols. In addition, a system including the second motor coil, a second inverter as a second driving circuit that supplies electric power to the second motor coil, and a second relay connected between the second inverter and the battery is collectively referred to as a second system, and will be explained by designating "b" at the end of each of constituent element's symbols. Note that, the motor coils are not necessarily limited to the two sets; three sets or more of them may be provided.

In FIG. 1, the electric power steering apparatus 100 according to Embodiment 1 of the present invention includes the motor 3 for producing driving force to assist in steering force of a driver; the first inverter 20a as the first driving circuit; the second inverter 20b as the second driving circuit; a control unit (hereinafter referred to as an "ECU") 10; the battery 4 mounted on a wheeled vehicle; the first relay 6a that controls power-source supply from the battery 4 to the first inverter 20a; the second relay 6b that controls power-source supply from the battery 4 to the second inverter 20b; a choke coil 5 connected between the battery 4, and the first relay 6a and the second relay 6b; sensors 2 for detecting steering torque of the driver, a wheeled-vehicle speed, and the like; and a notification device 9 for notifying the driver or the like of abnormality of the electric power steering apparatus.

The choke coil 5 described above is provided for preventing noise from being outputted to other devices because the first inverter 20a or the second inverter 20b generates the noise by switching the switching devices at high speed according to a PWM control as will be described later. When the first inverter 20a or the second inverter 20b becomes faulty, the notification device 9 described above notifies the driver of an occurrence of the fault using audio, light, vibration, and the like.

The motor 3 is a motor of a brushless type, and includes the motor coils 3a and 3b that are two sets of armature windings formed in three-phase delta connections. In the following explanation, one motor coil 3a in these motor coils is referred to as the first motor coil, and the other motor coil 3b, referred to as the second motor coil.

The first inverter 20a is constituted of six switching devices T1a, T2a, T3a, T4a, T5a and T6a made of field-effect transistors (hereinafter referred to as "FETs") three shunt resistors Rua, Rva and Rwa, and one smoothing capacitor C1a. In the six switching devices, the switching devices T1a, T3a and T5a are inserted in a phase-U upper arm, a phase-V upper arm and a phase-W upper arm of a three-phase bridge circuit, respectively, and the switching devices T2a, T4a and T6a are inserted in a phase-U lower arm, a phase-V lower arm and a phase-N lower arm of the three-phase bridge circuit, respectively.

The shunt resistors Rua, Rva and Rwa provided for detecting motor currents as will be described later are connected between the switching devices T2a, T4a and T6a, respectively, and to a ground level of the vehicle. The smoothing capacitor C1a connected between a common connecting portion of the switching devices T1a, T3a and T5a, and the ground level of the vehicle is provided for smoothing a power-source voltage supplied to the first inverter 20a.

A phase-U alternating-current (AC) terminal that is a series connecting portion between the switching device T1a and the switching device T2a is connected to a phase-U terminal of the first motor coil 3a of the motor 3; a phase-V AC terminal that is a series connecting portion between the switching device T3a and the switching device T4a, connected to a phase-V terminal of the first motor coil 3a; and a phase-W AC terminal that is a series connecting portion between the switching device T5a and the switching device T6a, connected to a phase-N terminal of the first motor coil 3a.

Each end of upper arms in each phase of a three-phase bridge circuit configured to include the respective switching devices T1a, T3a and T5a is mutually connected in common to form a positive electrode-side DC terminal of the first inverter 20a, and is connected to a positive electrode-side terminal of the battery 4 by way of the first relay 6a. Meanwhile, each end of lower arms in each phase of the three-phase bridge circuit configured to include the respective switching devices T2a, T4a and T6a forms negative electrode-side DC terminals of the first inverter 20a, and is connected to the ground level of the vehicle through the shunt resistors Rua, Rva and Rwa, respectively.

The second inverter 20b is constituted of six switching devices T1b, T2b, T3b, T4b, T5b and T6b made of FETs, three shunt resistors Rub, Rvb and Rwb, and one smoothing capacitor C1b. In the six switching devices, the switching devices T1h T3h and T5b are inserted in a phase-ti upper arm, a phase-V upper arm and a phase-W upper arm of a three-phase bridge circuit, respectively, and the switching devices T2b, T4b and T6b are inserted in a phase-U lower arm, a phase-V lower arm and a phase-W lower arm of the three-phase bridge circuit, respectively.

The shunt resistors Rub, Rvb and Rwb provided for detecting motor currents as will be described later are connected between the switching devices T2b, T4b and T6b, respectively, and to the ground level of the vehicle. The smoothing capacitor C1b connected between a common connecting portion of the switching devices T1b, T3b and T5b, and the ground level of the vehicle is provided for smoothing a power-source voltage supplied to the second inverter 20b.

A phase-U AC terminal that is a series connecting portion between the switching device T1b and the switching device T2b is connected to a phase-U terminal of the second motor coil 3b of the motor 3; a phase-V AC terminal that is a series connecting portion between the switching device T3b and the switching device T4b is connected to a phase-V terminal of the second motor coil 3b; and a phase-W AC terminal that is a series connecting portion between the switching device T5b and the switching device T6b is connected to a phase-W terminal of the second motor coil 3b.

Each end of upper arms in each phase of a three-phase bridge circuit configured to include the respective switching devices T1b, T3b and T5b is mutually connected in common to form a positive electrode-side CC terminal of the second inverter 20b, and is connected to the positive electrode-side terminal of the battery 4 by way of the second relay 6b. Meanwhile, each end of lower arms in each phase of the three-phase bridge circuit configured to include the respective switching devices T2b, T4b and T6b forms negative electrode-side DC terminals of the second inverter 20b, and is connected to the ground level of the vehicle through the shunt resistors Rub, Rvb and Rwb, respectively.

The ECU 10 mounts thereon a microcomputer (hereinafter referred to as a "CPU") 13 that mainly serves the functions of the ECU. The CPU 13 includes, as built-in units, an ordinary control-value calculation unit 11 for calculating a control value as a target current control-value in ordinary times in a case in which a failure or fault does not occur as will be described later, a fault detection unit 12 for detecting a fault(s) of the first inverter 20a and the second inverter 20b, and a fault control-value calculation unit 14 for calculating a control value (s) as a target current control-value (s) to respond to a faulty time.

Note that, in FIG. 1, the first inverter 20a, the second inverter 20b, the first relay 6a and the second relay 6b, and the ECU 10 are separately configured with each other; however, it may be adopted that at least one of the first inverter 20a, the second inverter 20b, the first relay 6a and the second relay 6b is built in the ECU 10.

The CPU 13 in the ECU 10 calculates a target current control-value (s) of the motor 3 using the ordinary control-value calculation unit 11 or the fault control-value calculation unit 14 described above based on information, for example, steering torque and a vehicle speed from the sensors 2, and supplies gate signals corresponding to the target current control-value (s) to the gates of each of the switching devices of the first inverter 20a and the second inverter 20b by way of signal lines 8, so that these switching devices are subjected to PWM controls. The motor 3 is driven by three-phase AC power that is subjected to the PWM controls by the first inverter 20a and the second inverter 20b, and produces desired assist torque that is added to a steering shaft (not shown in the figure) The target current control-value (s) calculated using the ordinary control-value calculation unit 11 or the fault control-value calculation unit 14 is distributed between the first inverter 20a and the second inverter 20b, so that the quantities of electric currents are shared by the first motor coil 3a and the second motor coil 3b. This sharing ratio can be arbitrarily set.

A phase-U terminal voltage Mua, a phase-V terminal voltage Mva and a phase-W terminal voltage Mwa of the first motor coil 3a derived from a phase-U AC terminal, a phase-V AC terminal and a phase-W AC terminal of the first inverter 20a are inputted into the CPU 13 by way of signal lines 7, respectively. In addition, a phase-U motor current Iua, a phase-V motor current Iva and a phase-W motor current Iwa that flow in the first motor coil 3a are derived from the connecting portions between each of the shunt resistors Rua, Rva and Rwa, and each of the switching devices T2a, T4a and T6a of the first inverter 20a, and are inputted into the CPU 13 by way of the signal lines 7, respectively.

Similarly, a phase-U terminal voltage Mub, a phase-V terminal voltage Mvb and a phase-W terminal voltage Mwb of the second motor coil 3b derived from a phase-U AC terminal, a phase-V AC terminal and a phase-W AC terminal of the second inverter 20b are inputted into the CPU 13 by way of the signal lines 7, respectively. In addition, a phase-U motor current Iub, a phase-V motor current Ivb and a phase-W motor current Iwb that flow in the second motor coil 3b are derived from the connecting portions between each of the shunt resistors Rub, Rvb and Rwb, and each of the switching devices T2b, T4b and T6b of the second inverter 20b, and are inputted into the CPU 13 by way of the signal lines 7, respectively.

In the electric power steering apparatus configured as described above according to Embodiment 1 of the present invention, the first system and the second system control, in ordinary times, the quantities of electric currents in the first motor coil 3a and the second motor coil 3b in accordance with predetermined sharing values based on an output from the ordinary control-value calculation unit 11 in the ECU 10, and produce the desired assist torque on the motor 3.

The CPU 13 provided in the ECU 10 calculates, in ordinary times, a target current control-value(s) of the motor 3 by the ordinary control-value calculation unit 11 based on information of driver's steering torque, a vehicle speed and the like inputted from the sensors 2 as described above, and supplies gate signals corresponding to the aforementioned sharing values in response to the calculated target current control-value (s) to the gates of each of the switching devices of the first inverter 20a by way of the signal lines 8, so that the switching devices thereof are subjected to a PWM control. Similarly, the CPU supplies gate signals corresponding to the aforementioned sharing values in response to the aforementioned calculated target current control-value(s) to the gates of each of the switching devices of the second inverter 20b by way of the signal lines 8, so that the switching devices thereof are subjected to a PWM control.

The motor 3 is driven in accordance with the first motor coil 3a that is energized by three-phase AC power subjected to the PWM control by the first inverter 20a and with the second motor coil 3b that is energized by three-phase AC power subjected to the PWM control by the second inverter 20b, and produces assist torque corresponding to driver's steering torque and a vehicle speed so that the torque is added to a steering shaft (not shown in the figure).

These operations described above are the summary operations in ordinary times as the electric power steering apparatus is in usual times.

Note that, in the ordinary times, it is also possible to arrange that either one of the first system or the second system may be only selected so as to drive the motor 3, and that the other system is put into a resting state.

Figure 2:
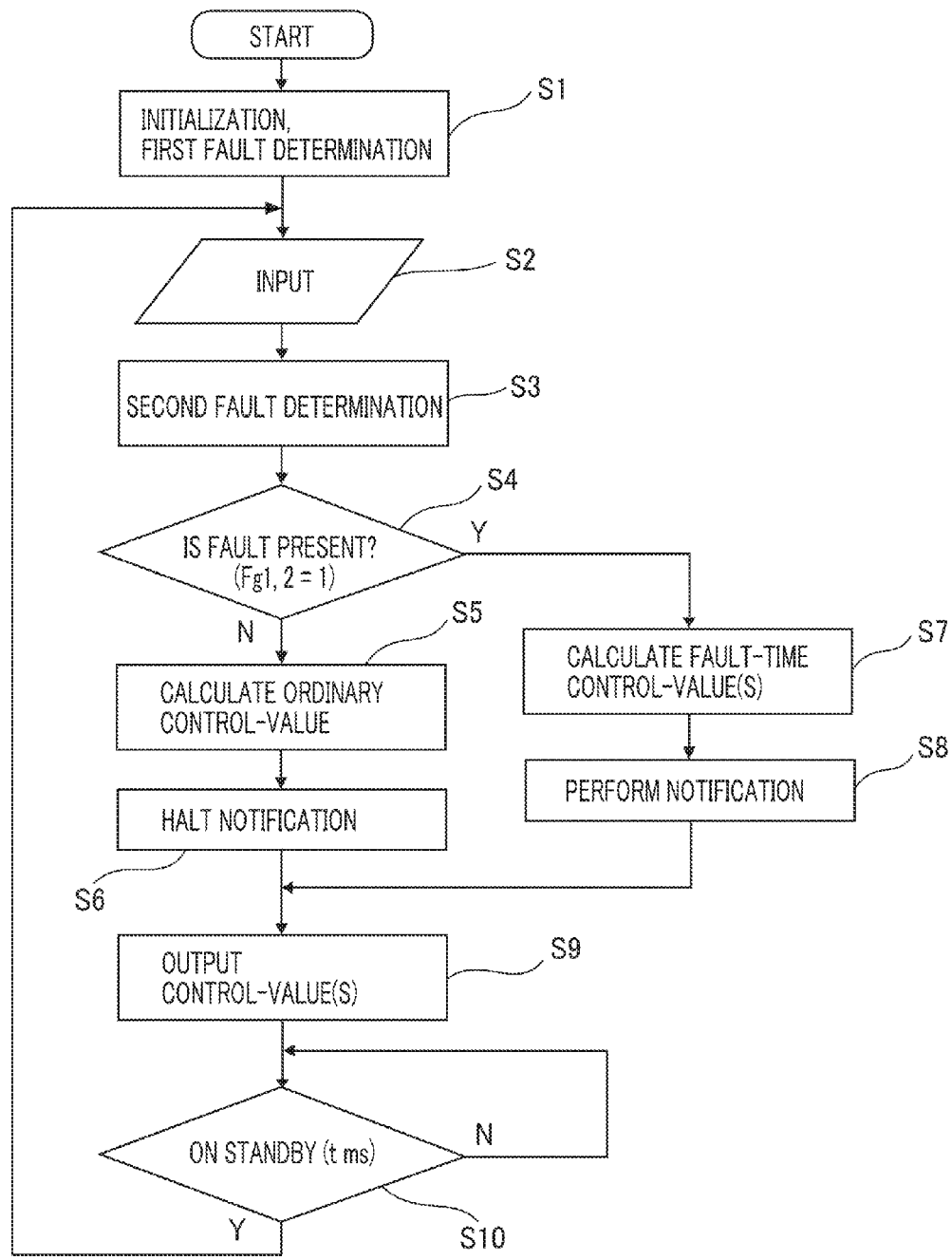
FIG. 2 is a flowchart illustrating operations of the electric power steering apparatus according to Embodiment 1 of the present invention.

Next, the explanation will be made for the details of fault detection in the electric power steering apparatus according to Embodiment 1 of the present invention, and those of operations including a control in a faulty time in the apparatus. FIG. 2 is a flowchart illustrating operations of the electric power steering apparatus according to Embodiment 1 of the present invention, showing processing routines of the CPU 13 built-in the ECU 10.

In FIG. 2, when a power source of the vehicle is switched on by an operation of an ignition key, initialization of a RAM (not shown in the figures), ports (not shown in the figures), and the like of the CPU 13 is first performed at Step S1. The initialization is a process that is only processed when the power source is switched on. At Step S1, a first fault determination other than the initialization described above is carried out.

The aforementioned first fault determination is determination in which operating states are checked on each of the switching devices T1a, T2a, T3a, T4a, T5a and T6a in the first inverter 20a, each of the switching devices T1b, T2b, T3b, T4b, T5b and T6b in the second inverter 20b, the first relay 6a and the second relay 6b, and then determination is performed on the presence or absence of a fault for each of the checking-object's items. Specifically, according to instructions from the CPU 13, turn-on/turn-off instructions are outputted for every one of the checking-object's items described above, and their checking is performed by monitoring the individual phase terminal-voltages Mua, Mva and Mwa of the first motor coil 3a and the individual phase motor currents Iua, Iva and Iwa, and also the individual phase terminal-voltages Mub, Mvb and Mwb of the second motor coil 3b and the individual phase motor currents Iub, Ivb and Iwb.

For example, in checking on the switching device T1a, it possible to determine, in a state of a power source from the battery 4 being supplied by turning-on the first relay 6a, the presence or absence of a fault in this switching device T1a by turning-on the switching device T1a and checking if the phase-U terminal voltage Mua appears or not, and also by turning-off the switching device T1a and checking if the phase-U terminal voltage Mua disappears or not.

In addition, checking is performed on whether or not a motor current flows, for example, by simultaneously turning-on the switching device T3a of the phase-V upper arm and the switching device T2a of the phase-U lower arm for a short time, and by determining whether or not a phase-U motor current Iua flows in the first motor coil 3a. According to the above, the first fault determination is performed by checking the checking-object's items on a one-by-one basis and/or by checking respective switching devices that form pairs, so that the fault detection is made possible before starting the control of the electric power steering apparatus.

In the first, fault determination, not only the fault determination of the aforementioned switching devices, but also the presence or absence of an open circuit or a short circuit in the first motor coil 3a and the second motor coil 3b of the motor 3 can be similarly checked. A fault determination due to an open circuit or a short circuit in the first motor coil 3a and the second motor coil 3b can be performed using a mode in which a plurality of switching devices becomes faulty at the time of checking the presence or absence of a fault in each of the switching devices.

In the processing of the first fault determination at Step S1 described above, if any of fault is detected, a flag Fg1 is set, and also content of the fault is stored. If a fault cannot be detected, the flag Fg1 is reset.

Next, at Step S2, pieces of the information, for example, driver's steering torque, a vehicle speed and the like, are each inputted from the sensors 2 into the CPU 13 in the ECU 10. Next, at Step S3, a fault determination is performed for a second time. The fault determination at this Step S3 is referred to as a second fault determination. This processing of the second fault determination is similar to the first fault determination at Step S1 described above; however, the checking is repeated for a number of times as long as the power source is switched on, and moreover, the checking is performed even during the motor control.

Because performing the checking on each of the switching devices on a one-by-one basis during the motor control primarily exerts an effect on the control of the electric power steering apparatus, there are many cases causing difficulties to achieve. For this reason, in the second fault determination at Step S3, the fault determination is carried out by performing the checking alongside of the control states for example, whether or not a motor terminal voltage (s) coincides with a target control value, whether or not a motor current (s) is substantially separated from a target current, or the like.

For example, during the motor control by the first system, if the switching devices in the first inverter 20a partially causes an open circuit, fault or a short circuit fault, such an open circuit fault or a short circuit fault in those switching devices can be detected by monitoring each of the individual phase terminal-voltages Mua, Mva and Mwa of the first motor coil 3a.

Similarly, in a case also during the motor control by the second system, if the switching devices in the second inverter 20b partially causes an open circuit fault or a short circuit fault, such an open circuit fault or a short circuit fault in those switching devices can be detected by monitoring each of the individual phase terminal-voltages Mub, Mvb and Mwb of the second motor coil 3b.

In addition, by monitoring the individual phase motor currents Iua, Iva and Iwa during the motor control by the first system, it is possible to check that, if an electric current flows in a checking-object's phase at a timing when gate signals are not supplied to a switching device (s) corresponding to the checking-object's phase, a short circuit fault occurs in the switching device (s) corresponding to the checking-object's phase. Moreover, according to these checking procedures, it can be said that, in a similar manner to the case at Step S1, the fault determination is also inclusively performed for an open circuit or a short circuit in the first motor coil 3a.

Similarly, by monitoring the individual phase motor currents Iub, Ivb and Iwb in a case also during the motor control by the second system, it is possible to check that, if an electric current flows in a checking-object's phase at a timing when gate signals are not supplied to a switching device (s) corresponding to the checking-object's phase, a short circuit fault occurs in the switching device (s) corresponding to the checking-object's phase. Moreover, according to these checking procedures, it can be said that, in a similar manner to the case at Step S1, the fault determination is also inclusively performed for an open circuit or a short circuit in the second motor coil 3b.

In the second fault determination at Step S3, if a fault is detected, a flag Fg2 is set, and if a fault is not detected, the flag Fg2 is reset. In addition, when a fault is determined, content of the fault, identification of the faulty switching device (s), an open circuit fault or a short circuit fault in the motor coil(s), and the like are stored.

Note that, if the motor control is not currently in progress, it is possible to perform checking on each of the switching devices in a similar manner to the case at Step S1.

Next, at Step S4, checking is performed whether or not a fault is detected by the first fault determination and the second fault determination described above. Namely, the presence or absence of a fault is determined based on whether or not the aforementioned flag Fg1 or flag Fg2 is set at "1." As a result of the determination, if neither of the flag Fg1 nor the flag Fg2 is set at "1," determination is made that a fault is not present (N), the processing proceeds to Step S5, so that calculation of an ordinary control-value is performed by the ordinary control-value calculation unit 11 of the CPU 13.

The calculation of the ordinary control-value at Step S5 is a calculation in which a control value is calculated similarly to the conventional apparatus so that, using steering torque, a vehicle speed, the difference between a target current and an actual current and the like, motor current values coincide with the target value. And then, the result is distributed to two systems between the first system and the second system. As described above, this sharing ratio between the two systems can be arbitrarily set. Next, the processing proceeds to Step S6, the fault notification to the driver is halted.

On the other hand, if determination is made that a fault occurs (Y) at Step S4, the processing proceeds to Step S7, and a fault-time control-value (s) is calculated. The processing at this Step S7 corresponds to that in the fault control-value calculation unit 14 in FIG. 1. In order to calculate the fault-time control-value(s), it is first required to determine content of the fault. In one system between the two systems, if determination is made that one of the switching devices has an open circuit or short circuit fault, control values are calculated so that the one faulty system continues its control even though a target current is decreased from the three-phase control to a two-phase control. In the other normal system, the control value is increased by additively increasing it by the quantity of decrease of the control value in the one faulty system.

In addition, in the first inverter 20a or the second inverter 20b, a faulty system cannot be used in such a case of critical faults when an upper-arm switching device and a lower-arm switching device in one phase simultaneously cause short circuit faults, and when a short circuit fault causes in the first motor coil 3a or the second motor coil 3b; and therefore, it is inevitable to interrupt the relay of the faulty system. In this case, the control value is calculated so that a motor current is supplied in the normal system up to a maximum of two times. Namely, at Step S7, the fault-time control-value(s) is calculated in accordance with the order of fault so that the electric current's control value in the normal system is increased larger than an ordinary one up to a maximum of two times.

Next, at Step S8, a signal to the notification device 9 is outputted so as to perform the fault notification to the driver. It may be adopted that the notification device 9 is not a notification device of one type with sound, light or the like, but a device of a plurality of types of notification devices that are combined. Moreover, by suitably adopting that, even with one type of notification device, for example, a fault indicator lamp not only lights up, but also flashes on and off, the fault notification to the driver can be reliably performed.

Next, the processing proceeds to Step S9, and the control value calculated at Step S5 or Step S7 is distributed between the first system and the second system based on a predetermined sharing ratio; gate signals based on those distributed control values are outputted to gates of each of the switching devices in the first inverter 20a and the second inverter 20b.

Next, at Step S10, the processing is on standby so that a next processing can be carried out at a period t [msec] of the CPU 13. When the t [msec] lapses after having completed the current processing, the processing returns to Step S2 for a second time, so that the next processing similar to the current processing is continued.

Figure 3:
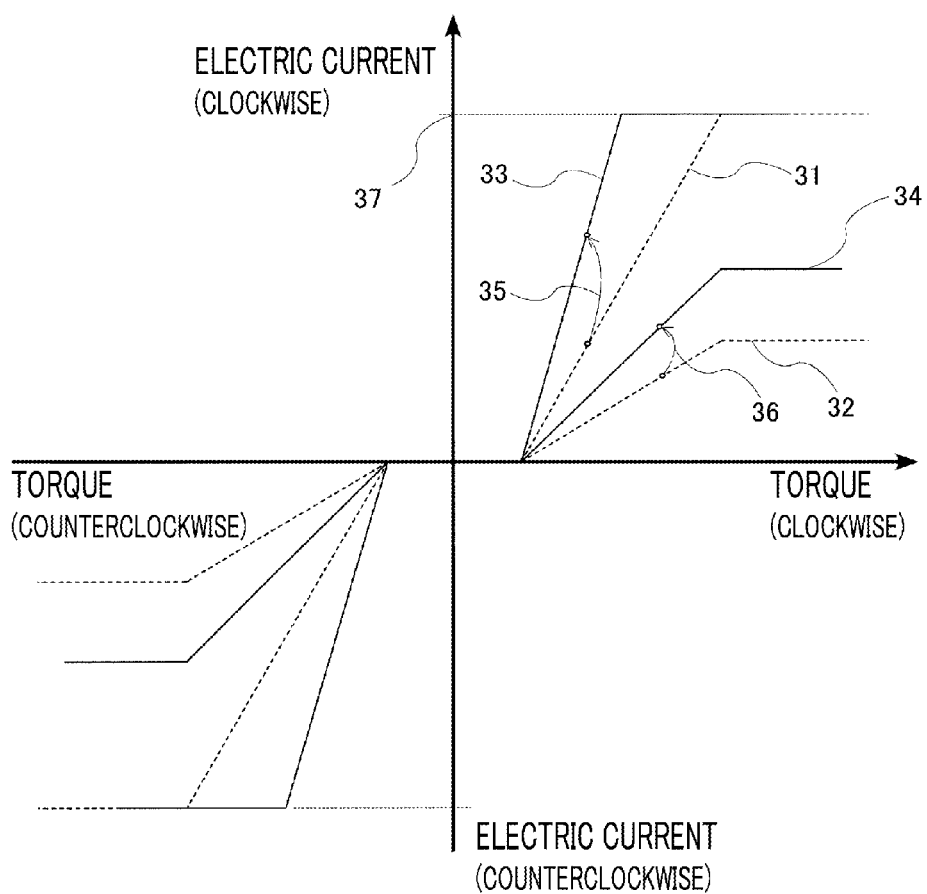
FIG. 3 is a control characteristic diagram of the electric power steering apparatus according to Embodiment 1 of the present invention.

Hereinbefore, the explanation is made for the operations of the electric power steering apparatus according to Embodiment 1 of the present invention; next, the explanation will be made in more detail for calculation of a fault-time control-value (s) at Step S7 described above. FIG. 3 is a control characteristic diagram of the electric power steering apparatus according to Embodiment 1 of the present invention, depicting a relationship of motor currents with respect to torque on the motor.

In FIG. 3, the horizontal axis designates torque; the "+" value side designates clockwise torque, and the "−" value side, counterclockwise torque. The vertical axis designates a target motor current; the "+" value side indicates a target motor current that produces clockwise torque, and the "−" value side, a target motor current that produces counterclockwise torque. Because counterclockwise control characteristics are equivalent to clockwise control characteristics, the explanation will be made only for the clockwise control characteristics in the following description.

In FIG. 3, control characteristics 31 and 32 indicated by the broken lines show ordinary time control characteristics in cases of ordinary controls in which the two systems described above are both not faulty, and control characteristics 33 and 34 indicated by the solid lines show fault-time control characteristics in the other normal system when one of the two systems becomes faulty. The ordinary time control characteristic 31 and the fault-time control characteristic 33 are in the cases in which a vehicle speed is approximately "0" [km/h], and the ordinary time control characteristic 32 and the fault-time control characteristic 34 show the cases when a vehicle speed is approximately "20" [km/h].

Currently, it is presumed that the vehicle is running at its speed of approximately "20" [km/h] when a fault occurs in one of the two systems, the other system being normal takes on the fault-time control characteristic 34 increased at a predetermined increase ratio 36 in comparison with the ordinary time control characteristic 32. Meanwhile, in a case in which the wheeled-vehicle speed is approximately "0" [km/h] when a fault occurs in one of the two systems, the other system that is normal takes on the fault-time control characteristic 33 increased at a predetermined increase ratio 35 in comparison with the ordinary time control characteristic 31. In this case, the fault-time control characteristic 33 takes on the control characteristic having an electric current value that is about two times as large as that in the ordinary time control characteristic 31.

It is well known that, in a switching device such as an field-effect transistor, for example, there exists a maximum value in an electric current in which the device can flow therethrough. A maximum current value 37 shown in FIG. 3 indicates the maximum current value of each of the switching devices in the first inverter 20a and the second inverter 20b. This maximum current value 37 is a maximum current value that is defined after characteristics of each of the switching devices and heat generation of the switching devices are also taken into consideration; the ECU 10 does not output such a control value that exceeds the maximum current value 37, and, in proximity to the maximum current value 37, the motor 3 cannot be driven for a long time when heat generation of the switching devices is taken into consideration.

The fault-time control characteristic 33 in the aforementioned vehicle speed of "0" [km/h] reaches the maximum current value 37 described above at a smaller torque value in comparison with the ordinary time control characteristic 31 in a case of a vehicle speed of "20" [km/h]. Meanwhile, in ordinary running times such that the vehicle is running at the speed of "20" [km/h], it is also possible to arrange as shown in FIG. 3 that the fault-time control characteristic 34 is a control characteristic having a smaller electric current value than a value of two times to the ordinary time control characteristic 32; in this case, the maximum current value 37 is not reached, so that the increase ratio 36 for the control value can be freely changed.

In general, there are not many states in which the maximum current value 37 is reached during an actual vehicle running, and the electric current is supplied to the motor 3 at the maximum current value 37 for a long time; and there are many states in which a range that is less than or equal to half of the maximum current value 37 is used on average. For this reason, during a faulty time of one system, it is possible in practical use to secure steering torque by only the other normal system.

In FIG. 3, in a faulty time of one system, an increase ratio of a control characteristic of the other normal system, changes in accordance with a vehicle speed; when the vehicle speed is at approximately "0" [km/h], the increase ratio reaches the maximum value. The control characteristic 33 in this case takes on the control characteristic having an electric current value that is two times as large as that in the ordinary time control characteristic 31 in which a fault does not occur, as described above.

In the faulty time of the one system described above, the increase ratio of the control characteristic of the other normal system can be arbitrarily changed as the vehicle speed becomes higher; the increase ratio finally approaches "1." Meanwhile, in the faulty system, it is sufficient to arrange that, in place of an arbitrary decrease ratio, decrease ratios changing in a plurality of steps are used in such a manner as in the number of effective phases, for example, in [two phases≈60%], or in a [single phase≈30%], [50%] or [0%] For this reason, in a case in which the normal system is driven depending on the decreased control value based on the decrease ratios that change stepwise in the faulty system, it may be adopted that the aforementioned increase ratio is changed stepwise to [+30%], [+50%], [+60%] or [+100%] In addition, it may be adopted that, when the ratio is changed stepwise, the change may not be made sharply to a different value, but a gradual change is made so as to finally approach to the value.

The change of the increase ratio of the normal system can be made, other than the case depending on the vehicle speed, to depend on an electric current value, a multiplication value of the electric current value or a square value of electric current, or the change can also be made so that the smaller the electric current value is or the smaller the multiplication value is, the larger the increase ratio is increased. Such a method of changing the increase ratio is a method to which, by particularly considering heat generation of the components, consideration is given so that the normal system may not also become faulty by overusing the normal system. In addition, it is also possible to arrange that the increase ratio is continued to be outputted for a predetermined time after the fault, and, from that time onward, is gradually decreased to a predetermined value. Moreover, in place of the increase ratio and the decrease ratio, similar effects can be achieved by compensating them as an addition value and a subtraction value.

Note that, the aforementioned increase ratio in the normal system described above sets a value that corresponds to the number of systems as a maximum increase ratio. Namely, if the number of systems is "2" as in a case in Embodiment 1, the increase ratio is a maximum of two times; if the number of systems is "3," the increase ratio is a maximum of three times.

As described above, according to the electric power steering apparatus in Embodiment 1 of the present invention, fault in one system is detected, and, in accordance with a state of that fault, a current control characteristic is decreased or the drive control is stopped in the faulty system; in the normal system, the current control characteristic is increased in comparison with an ordinary current control characteristic; and, by continuing the control at the increase ratio up to a maximum of the number of systems, it is possible, without reducing a sum total of torque for steering assist, to maintain the assist force and continue providing it to the driver as much as possible. According to this arrangement, a workload of the driver is mitigated, and running of the vehicle is made easier; in addition, when part of system(s) in a plurality of systems becomes faulty, a sharp change of steering torque is not caused, so that it is possible to secure steering capability, and also to contribute to stable running of the vehicle.

Embodiment 2

Figure 4:
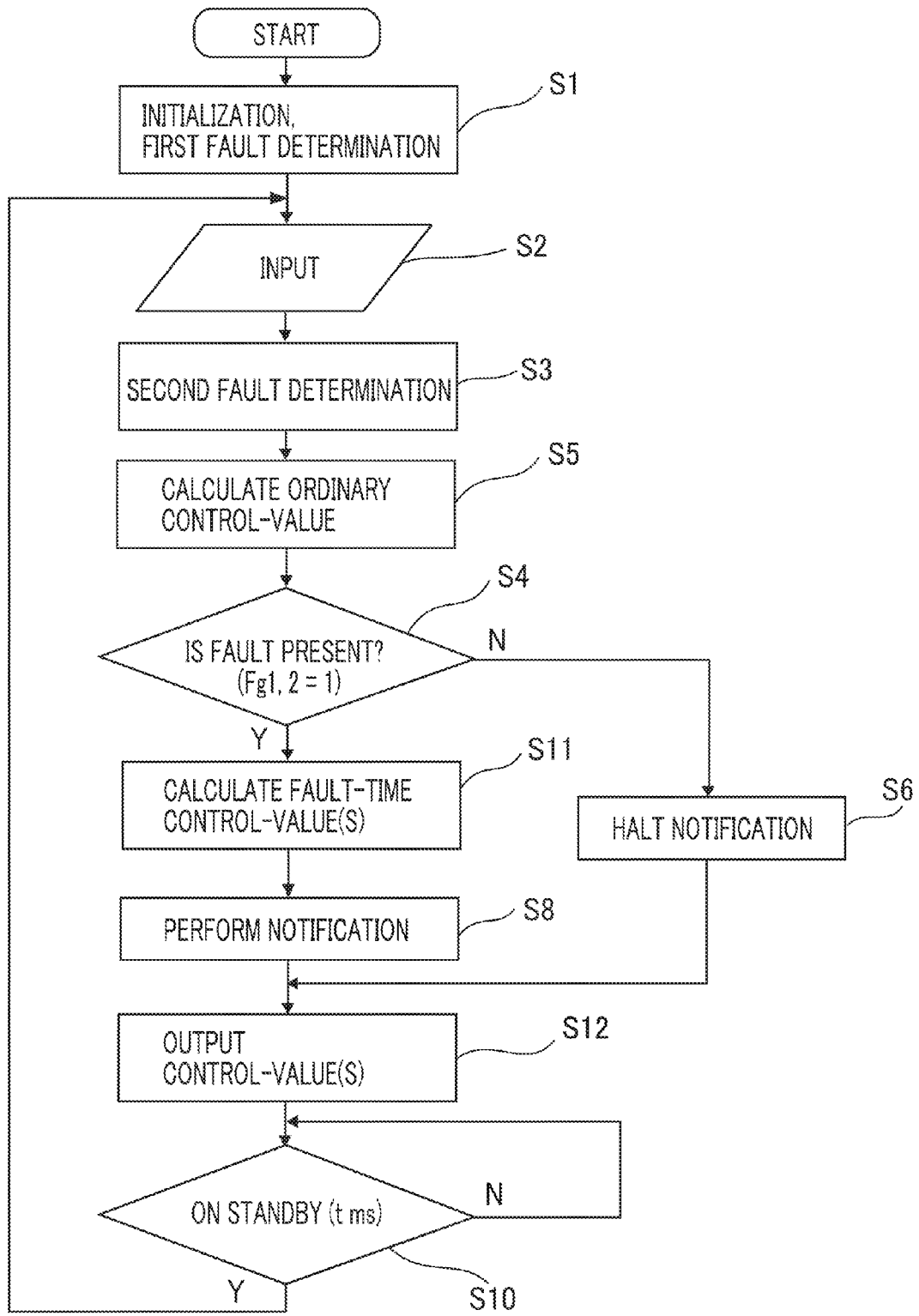
FIG. 4 is a flowchart illustrating operations of an electric power steering apparatus according to Embodiment 2 of the present invention.

Next, the explanation will be made for an electric power steering apparatus according to Embodiment 2 of the present invention. FIG. 4 is a flowchart illustrating operations of the electric power steering apparatus according to Embodiment 2 of the present invention; the same reference numerals and symbols in FIG. 2 in Embodiment 1 designate that equivalent processing is performed at those; meanwhile, main points which differ from the flowchart of FIG. 2 are that fault-time control-value calculation and its output are different. The circuit configuration of the electric power steering apparatus according to Embodiment 2 of the present invention is equivalent or similar to those shown in FIG. 1 in the case of Embodiment 1.

In FIG. 4, when a power source of the vehicle is switched on by an operation of an ignition key, initialization of a RAM (not shown in the figures), ports, and the like of the CPU 13 is first performed at Step S1. The initialization is a process that is only processed when the power source is switched on. At Step S1, a first fault determination other than the initialization described above is carried out. Content of this first fault determination is similar to the content of Step S1 of FIG. 2 in Embodiment 1 described above.

In the processing of the first fault determination at Step S1, if any of fault described above is detected, the flag Fg1 is set, and also content of the fault is stored. When a fault cannot be detected, the flag Fg1 is reset.

Next, at Step S2, pieces of the information, for example, driver's steering torque, a vehicle speed and the like, each from the sensors 2 are inputted into the CPU 13 in the ECU 10. Next, at Step S3, a fault determination is performed for a second time. The fault determination at this Step S3 is referred to as the second fault determination. This processing of the second fault determination is similar to the first fault determination at Step S1 described above; however, the checking is repeated for a number of times as long as the power source is switched on, and moreover, the checking is performed even during the motor control. Content of the second fault determination at Step S3 is similar to the processing content at Step S3 of FIG. 2 described above.

In the second fault determination at Step S3, if a fault is detected, the flag Fg2 is set, and if a fault is not detected, the flag Fg2 is reset. In addition, when a fault is determined, content of the fault, identification of the faulty switching device (s), an open circuit fault or a short circuit fault in the motor coil(s), and the like are stored.

Next, calculation of an ordinary control-value is performed at Step S5. The calculation of an ordinary control-value is similar to the calculation at Step S5 in FIG. 2 described above. Next, the processing proceeds to Step S4, and checking is performed whether or not a fault is detected by the first fault determination and the second fault determination described above. Namely, the presence or absence of a fault is determined based on whether or not the aforementioned flag Fg1 or flag Fg2 is set at "1." As a result of the determination, if neither the flag Fq1 nor the flag Fg2 is set at "1," determination is made that a fault is not present (N), so that the processing proceeds to Step S6, and the fault notification to the driver is halted.

On the other hand, as a result of the determination at Step S4, if either of the flag Fg1 or the flag Fg2 is set at "1," the determination is made that a fault is present (Y), so that the processing proceeds to Step S11, and a fault-time control-value(s) is calculated. In the calculation of the fault-time control-value(s) at Step S11, a sharing ratio of output quantities between the two systems is changed in accordance with the content of a fault stored when the fault has been detected.

Namely, when one system between the two systems becomes faulty so that it is inevitable to decrease the current control characteristic by a predetermined value, the sharing ratio is changed so that, without changing a target current as much as possible, namely, without reducing the sum total of torque controlled by the driving circuits of the two systems as much as possible, an insufficient quantity of the faulty system is compensated by the other normal system. For example, when the faulty system is altered from three-phase driving to two-phase driving, a sharing ratio of output quantities between the normal system and the faulty system is set at [1.4:0.6], respectively.

Next, at Step S8, a signal to the notification device 9 is outputted to perform the fault notification to the driver in a similar manner as Step S8 in FIG. 2 described above. It may be adopted that the notification device 9 is not a notification device of one type with sound, light or the like, but a device of a plurality of types of notification devices that are combined. Moreover, by suitably adopting that, even with one type of notification device, for example, a fault indicator lamp not only lights up, but also flashes on and off, the fault notification the driver can be reliably performed.

Next, at Step S12, control values are outputted, during a faulty time, by setting the sharing ratio of output quantities between the normal system and the faulty system at [1.4:0.6], respectively; when a fault does not occur, control values are outputted by setting the ratio of those outputs at [1:1]. Therefore, ratios of outputs of the first system and the second system take on values from "1.0" to "2.0" in the normal systems, and, when the ratios of the outputs of the first system and the second system are added to each other, approximately "2.0" is given as the sum total of them.

In addition, at the time of a short circuit fault in one of the switching devices, the control is continued to some extent using remaining switching devices, and a control value is outputted in the normal system so that the amount of decrease of sharing an output quantity in the faulty system is compensated; although there is no reduction in a sum total of torque on average, torque variation is caused from a more microscopic viewpoint because of the fault. For this reason, it is also possible to arrange that, by increasing the ratio of sharing the output quantities for the normal system to some extent, and thus setting a sum total of both the ratios larger than "2.0," the reduction in the sum total of torque is eliminated more in the driver's feelings. Moreover, by particularly considering heat generation in the normal system, it is also possible to set a sum total of sharing of both the output quantities smaller than "2.0" to some extent, and to enhance ease of notification to the driver.

As described above, according to the electric power steering apparatus in Embodiment 2 of the present invention, the sharing ratio of output quantities each for the systems is changed in accordance with a state of a fault at the time when the fault is detected, so that a value of the target current is not changed, resulting in simpler processing. In addition, because a sum total of output quantities is not changed, the control can be continued without changing the quantity of assist to driver's steering torque; as a result, it is possible to achieve an effect to curb a workload of the driver.

Embodiment 3

Next, the explanation will be made for an electric power steering apparatus according to Embodiment 3 of the present invention. The electric power steering apparatus according to Embodiment 3 of the present invention has its features in a method of notifying the driver of which a manner to control is changed in a system when either one of the systems becomes faulty as described above in aforementioned Embodiment 1 or Embodiment 2. Namely, in Embodiment 1 and Embodiment 2 described above, the notification device 9 requires to mount with a speaker and/or a lamp, for example; however, in Embodiment 3, a notification device itself is not newly required. Note that, in a similar manner to the cases in Embodiment 1 and Embodiment 2, the notification device 9 may be separately provided.

Figure 5:
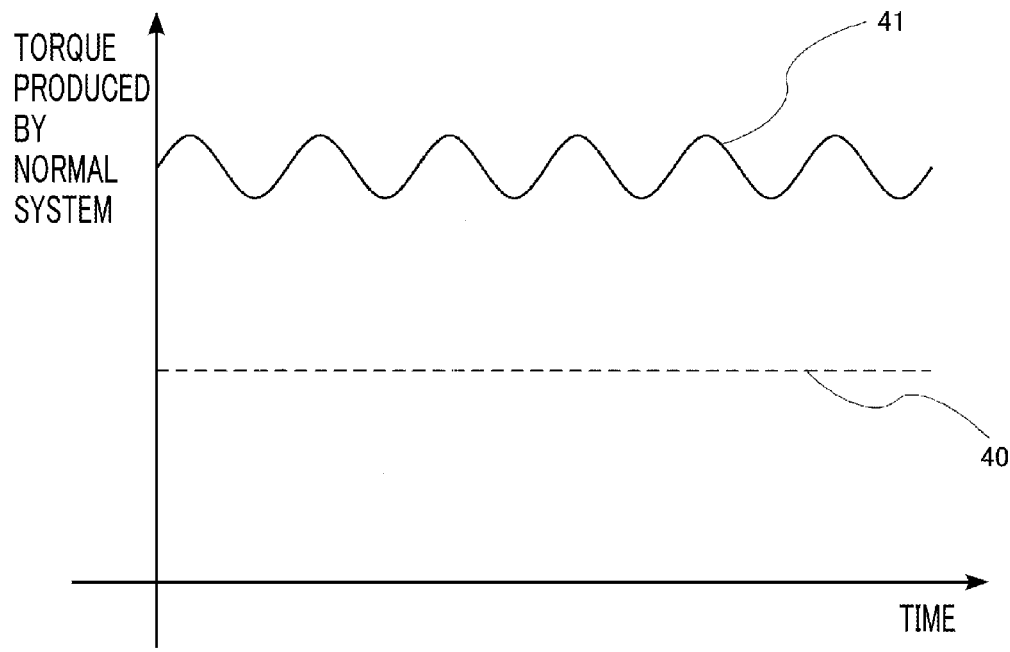
FIG. 5 is a characteristic diagram for explaining an electric power steering apparatus according to Embodiment 3 of the present invention.

FIG. 5 is a characteristic diagram for explaining the electric power steering apparatus according to Embodiment 3 of the present invention; in the characteristic diagram, an example torque is depicted so that the motor produces it by a normal system when a fault occurs. In FIG. 5, the vertical axis indicates the torque produced by the normal system, and the horizontal axis, time. As explained in aforementioned Embodiments 1 and 2, the sharing ratio of the output quantity by the normal system is increased when one of the systems becomes faulty, and an average value of torque produced on the motor in accordance with the normal system is made larger than the torque produced in a control characteristic in ordinary times when a fault does not occur, resulting in a characteristic of generally two times.

In FIG. 5, numeral "40" depicts torque produced in control characteristics in ordinary times when a fault does not occur. Numeral "41" depicts torque produced by a normal system when one of the systems becomes faulty. The torque "41" produced by the normal system when one of the systems becomes faulty is torque in which an alternating-current (AC) component between 1 [kHz] and 6 [kHz] being in the audible frequency range is superimposed on the produced torque due to increase in sharing of an output quantity, it is made possible to generate an electromagnetic sound between 1 [kHz] and 6 [kHz] from the motor. Therefore, without utilizing an additional hardware such as a special notification device or the like, it is possible to notify the fault to the driver using the electromagnetic sound of 1 [kHz] to 6 [kHz].

Figure 6:
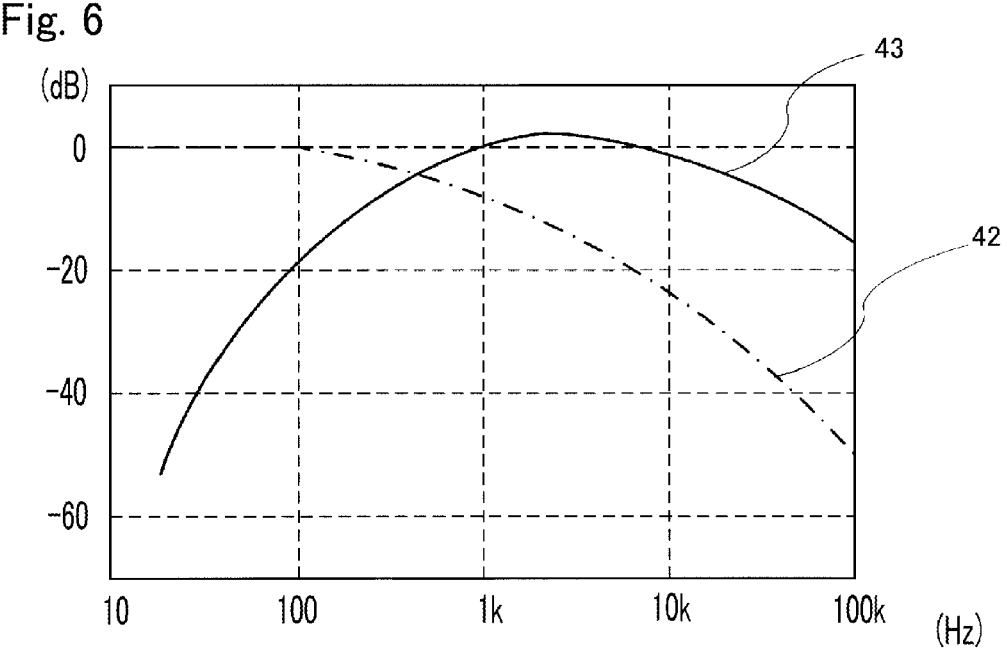
FIG. 6 is another characteristic diagram for explaining the electric power steering apparatus according to Embodiment 3 of the present invention.

FIG. 6 is another characteristic diagram for explaining the electric power steering apparatus according to Embodiment 3 of the present invention, depicting a relationship between frequencies and responses that are plotted. In FIG. 6, the horizontal axis indicates the frequencies [Hz], and the vertical axis, the responses [dB]. In FIG. 6, numeral "43" is referred to as the equal-loudness contour that depicts sensation of a human being relating to the magnitude of sound (loudness), indicating that auditory sensation of a human being is sensitive to sounds between 1 [kHz] and 6 [kHz].

Meanwhile, numeral "42" depicts a current control response curve; in the curve, responses of electric currents actually supplied are plotted with respect to desired electric currents to be supplied to the motor 3. As it can be understood from the curve "42" in FIG. 6, the responses on current control is lowered in the bandwidth of frequencies between 1 [kHz] and 6 [kHz].

To this end, in order to generate an electromagnetic sound between 1 [kHz] and 6 [kHz] from the motor 3, it is suitable that an alternating-current (AC) voltage between 1 [kHz] and 6 [kHz] appropriately be superimposed on an inverter-outputted voltage (s) generated in another normal system(s). Because the bandwidth of frequencies between these 1 [kHz] and 6 [kHz] is higher than a frequency of current control responses, the control of an inverter current(s) generated in the normal system (s) is not interfered, so that it is possible to generate the electromagnetic sound between 1 [kHz] and 6 [kHz] for notifying it to the driver.

As described above, according to the electric power steering apparatus in Embodiment 3 of the present invention, it is possible to notify, without newly adding a notification device to the apparatus, the driver of the failure or fault by superimposing an AC component (s) of a predetermined frequency on a control value (s) or variable (s) in another normal system (s).

Note that, in the present invention, each of the embodiments can be freely combined, appropriately modified and/or eliminated without departing from the scope of the invention.

INDUSTRIAL APPLICABILITY

The electric power steering apparatus according to the present invention can be utilized as a power steering apparatus of a wheeled vehicle such as an automotive vehicle.

What is claimed is:
1. An electric power steering apparatus configured to assist in steering force of a driver by driving force of a motor having a plurality of independent motor coils, the electric power steering apparatus comprising:

a plurality of systems including driving circuits which are provided for every one of the plurality of motor coils, and configured to drive the motor coils corresponding to the driving circuits; and a control unit configured to control values of the driving circuits, wherein, when a fault occurs in at least one of the plurality of systems including the motor coils, the control unit decreases a control value of a system in which the fault occurs from an ordinary time control value thereof or stops the drive by a system in which the fault occurs, and increases a control value of a system in which the fault does not occur to more than an ordinary time control value thereof, wherein the control unit comprises:

a fault detection unit configured to detect a fault of the plurality of systems including the motor coils corresponding thereto;

an ordinary control-value calculation unit configured to calculate an ordinary time control value of the plurality of systems in ordinary times when the fault detection unit does not detect the fault, and output the ordinary time control value being calculated to the plurality of systems; and a fault control-value calculation unit configured to calculate a first fault-time control value, when the fault detection unit detects the fault, so that the control value is decreased or the drive is stopped in accordance with a state of the fault and output the first fault-time control value being calculated to the system in which the fault occurs, and to calculate a second fault-time control value that is increased more than an ordinary time control value and output the second fault-time control value being calculated to the system in which the fault does not occur; and the plurality of motor coils are driven by the driving circuits of the systems corresponding thereto based on an output from the ordinary control-value calculation unit, when the fault detection unit does not detect the fault, and are controlled by the driving circuits of the systems corresponding thereto based on an output from the fault control-value calculation unit, when the fault detection unit detects the fault, wherein the fault control-value calculation unit decreases stepwise, in accordance with a state of the fault, the first fault-time control value outputted to the system in which the fault occurs.

2. The electric power steering apparatus as set forth in claim 1, wherein, when a fault occurs in at least one of the plurality of systems, the control unit increases, corresponding to the decrease of the control value of the system in which the fault occurs, the control value of the system in which the fault does not occur.

3. The electric power steering apparatus as set forth in claim 1, wherein the fault control-value calculation unit is capable of increasing, in accordance with a state of the fault, the second fault-time control value outputted to the system in which the fault does not occur, up to a value given by multiplying the ordinary time control value by the number of the systems.

4. The electric power steering apparatus as set forth in claim 1, wherein the fault control-value calculation unit changes, in accordance with a state of the fault being detected, a sharing ratio of output quantities between the first fault-time control value for the system in which the fault occurs and the second fault-time control value for the system in which the fault does not occur.

5. The electric power steering apparatus as set forth in claim 1, wherein the fault control-value calculation unit increases the second fault-time control value so that it becomes substantially larger than an ordinary time control value when a wheeled-vehicle speed is lower, and outputs the increased second fault-time control value to the system in which the fault does not occur.

6. The electric power steering apparatus as set forth in claim 1, wherein the number of steps being decreased stepwise comprises the number depending on the number of the systems.

7. The electric power steering apparatus as set forth in claim 1, wherein the plurality of motor coils is constituted of two sets of three-phase motor coils;
   the plurality of systems is constituted of two sets of systems corresponding to the two respective sets of motor coils;
   the two sets of systems including the motor coils are periodically monitored for a presence or absence of the fault; and
   objects for the monitoring include at least a terminal voltage of the motor and an electric current thereof.

8. The electric power steering apparatus as set forth in claim 1, further comprising a notification device configured to notify the driver of an occurrence of the fault at a time when the fault occurs.

9. The electric power steering apparatus as set forth in claim 1, wherein an alternating-current value in an audible frequency range is superimposed on the second fault-time control value outputted from the fault control-value calculation unit to the system in which the fault does not occur.

* * * * *